United States Patent Office 3,694,410
Patented Sept. 26, 1972

3,694,410
USE OF CHELATES IN PREPARING POLYCYANURATES
Richard W. Oehmke, Hudson, Wis., assignor to Minnesota Mining and Manufacturing Company, St. Paul, Minn.
No Drawing. Filed Mar. 5, 1969, Ser. No. 804,688
Int. Cl. C08g 33/00
U.S. Cl. 260—47 R                    8 Claims

ABSTRACT OF THE DISCLOSURE

Polycyanates, such as aromatic dicyanates and cyanatomethyl-terminated fluoroaliphtaic compounds, are mixed with metal chelate catalysts, such as zinc or ferric acetylacetonate, and heated to form cyanurate polymers. The polymers are useful in the preparation of adhesives, binders, coatings, and tooling compounds.

FIELD OF THE INVENTION

This invention relates to polycyanates and to a method for the preparation of cyanurate polymers therefrom. In a still further aspect, it relates to adhesives, binders, coatings, and shaped articles based on said cyanurate polymers.

BACKGROUND OF THE PRIOR ART

The polymerization (or trimerization) of polycyanates to form cyanurate polymers is generally known in the prior art (see German Pats. No. 1,190,184 and No. 1,195,764). Polymerization of some polycyanates can be effected by merely heating the polycyanates at elevated temperatures, but the reaction or curing is very rapid and uncontrollable or runway hazardous exothermic reactions take place and may yield a charred or otherwise undesirable product, e.g. the product may lack desired oxidative stability. Such elevated temperature requirements have the further disadvantage in that they may cause degradation of associated materials, for example, a substrate to which the cyanate is applied as a thermosetting adhesive or coating. Catalysts also have been used or proposed for promoting the curing of polycyanates. For example, German Pat. No. 1,190,184 discloses heating at 0–200° C. polycyanates of the general formula R(OCN)$_{2-5}$, where R is an aromatic residue, such as phenylene, or an aromatic residue connected by bridging members, to form high melting cyanurate polymers, using for this purpose relatively large amounts of trimerization promoting compounds, such as Lewis acids. Many of such catalysts are either moisture sensitive or hazardous and may have a detrimental effect on stability of the cured product. U.S. Pat. No. 3,297,639 discloses the preparation of certain cyanurate polymers by the non-catalytic interfacial condensation of triazinyl halides with certain salts of polyhydric aromatic compounds. However, the preparation of cyanurate polymers or prepolymers by heating polycyanates in the presence of metal chelates is not known in the art.

BRIEF SUMMARY OF THE INVENTION

Briefly, polycyanates, such as aromatic dicyanates, are polymerized in the presence of metal chelate catalysts, such as a zinc or ferric acetylacetonate. This polymerization can be effected at relatively low temperatures, or moderately elevated temperatures, at a smooth, controllable rate.

Metal chelates have never been used before in polymerizing polycyanates. Such catalysts are hydrolytically stable and can be used without special precautions and they do not adversely affect the thermal oxidative stability of the resultant polymers.

DETAILED DESCRIPTION OF THE INVENTION

The overall process of this invention can be illustrated as follows:

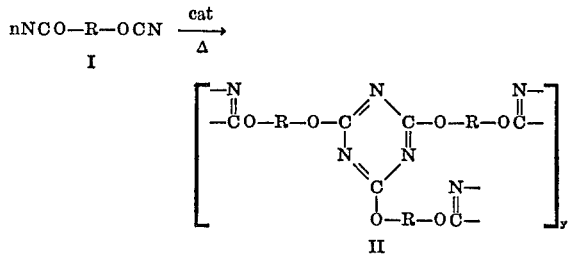

Formula I is a dicyanate which can be heated in the presence of the metal chelate catalyst to form the high molecular weight polycyanurate polymer shown in Formula II, where $y$ is in the range of about 20 to $n/3$, $n$ being the number of molecules of dicyanate used. The polycyanurate II has a three dimensional network structure with R linkages between cyanurate rings, and this polymer is generally insoluble, and infusible.

Cyanurate homopolymers can be formed from these polycyanates as well as cyanurate copolymers of two or more of these polycyanates. One or more monocyanates can be used in combination with one or more polycyanates in order to produce cyanurate polymers with modified properties, e.g. lower melting point. Such monocyanates can be expressed by the general formula NCO—R′, where R′ is like R defined below in Formula I except that it is monovalent, e.g., phenyl. The amount of monocyanate used will depend upon the properties of the polymer desired and generally will be from 5 to 50 mole percent of the polycyanate used.

The polydicyanates used in this invention are preferably dicyanates which can be represented by said general Formula I, viz, NCO—R—OCN, where R is a divalent aromatic nucleus, particularly an arylene such as phenylene, biphenyl, naphthalene, etc., or R can be a plurality (e.g. 2–5 or as many as 15 or more) of such aromatic nuclei, each of which can be separated by bridging members (e.g. —O—, —C(O)—, —S—, —SO$_2$—, or divalent hydrocarbon moieties, such as lower alkylene, e.g. methylene and dimethylmethylene) such as those nuclei selected from the group consisting of phenylene, diphenylene, and radicals of diphenyl ether, 2,2-diphenylpropane, benzophenone, and diphenylsulfone. R can also be a methylene-terminated fluoroaliphatic chain.

Aromatic polycyanates which can be used in this invention are known in the art, e.g. German Pat. No. 1,190,184, German Pat. No. 1,195,764, French Pat. No. 1,481,425, Angew Chemie, 76 303 (1964), and Acta. Chem. Scand., 18, 826 (1964).

Representative dicyanates which can be used are shown in Table I.

TABLE I

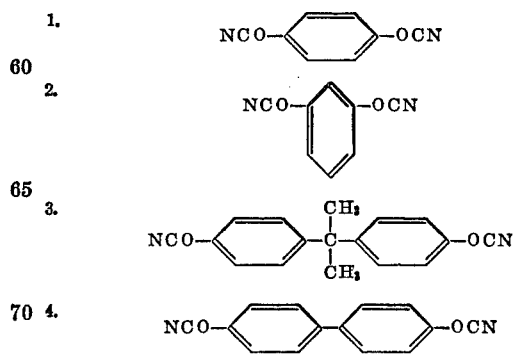

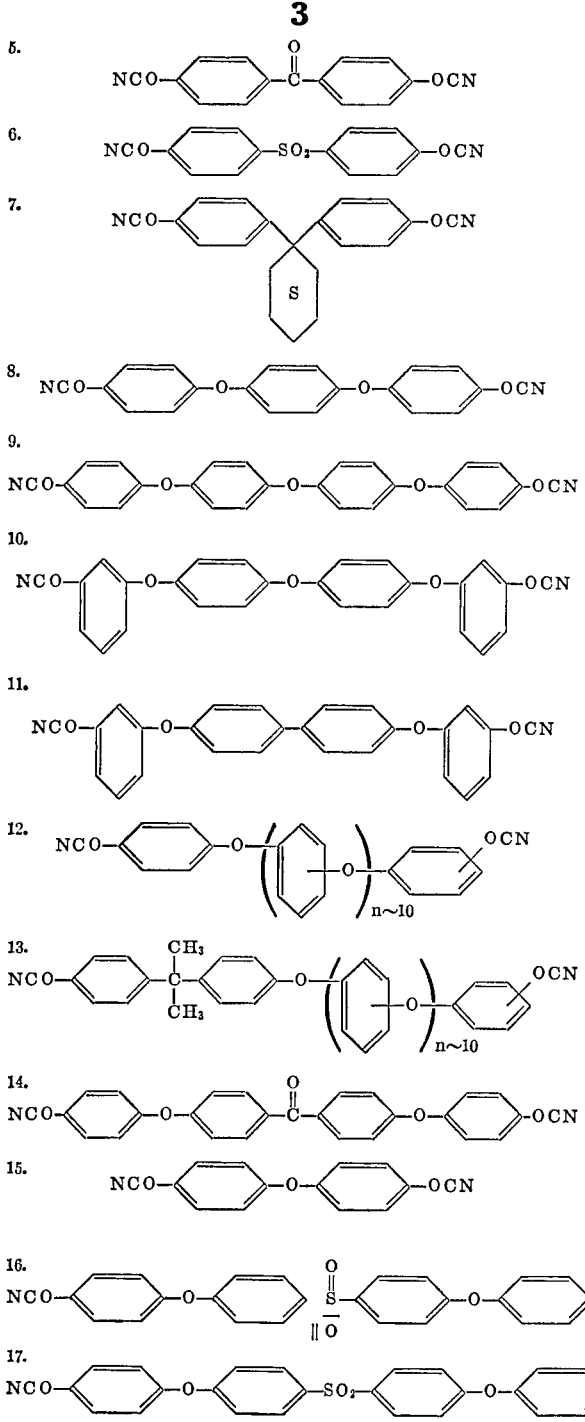

The dicyanates 1–7 and 15 represented by those shown in Table I are known in the art and dicyanates 8–14, 16 and 17 and their preparation are described in copending application Ser. No. 741,303, filed July 1, 1968, by Loudas and Vogel.

Other dicyanates which can be used in this invention include the cyanatomethyl-terminated fluorocarbons of the general formula:

$$NCOCH_2(CFX)_mB(CFX)_mCH_2OCN \quad (VII)$$

where

B is either: a carbon-to-carbon bond; or one or more ether-linked $(CFX)_m$ groups; or two

groups linked by $-O(CFX)_m$; or one or more blocks of $(CF_2CH_2)_n(CF_2CFX)$ where, in the above formula, X is fluorine or a perfluoro lower alkyl such as trifluoromethyl, and $m$ is an integer of 1 or higher. These cyanatomethyl-terminated fluorocarbons and their preparation are described in copending application Ser. No. 741,308, filed July 1, 1968 by Loudas and Vogel.

The metal chelates used as catalysts or promoters in the polymerization of the dicyanates, in accordance with this invention, are also known in the art. There is a vast number of metal chelates known in the art, and a large amount of data has been accumulated on their preparation, properties, and use. [For example, see Kirk-Othmer Encyclopedia of Chemical Technology, 2nd ed., vol. 6, pp. 1–24 (1965), The Chemistry of Coordination Compounds, edited by Bailar, published by Reinhold Publishing Corporation, New York (1956), and Inorganic Chemistry by Moeller, published by John Wiley & Sons, Inc., New York (1952), chap. 7 and U.S. Pat. No. 3,231,597].

In general, chelates of metal ions of the non-ionic type or the ionic type, with 1 to 6 or more chelate rings, can be used in this invention to catalyze or promote the polymerization of the dicyanate. However, chelates of transition metals and bidentate or tridentate ligands are preferred because they will be more readily available; in particular, I prefer to use the chelates of iron, cobalt, zinc, copper, manganese, zirconium titanium, vanadium, aluminum and magnesium.

There are, of course, a host of organic compounds with two or more donor atoms which can be used as ligands in the formation of the metal chelates used in this invention, the most common and widely used being those which have oxygen or nitrogen donor atoms, or a combination of the two. Those having sulfur donor atoms are also useful, including those in combination with oxygen and/or nitrogen donor atoms. Chelates of ligands having arsenic or phosphorous donor atoms are also useful in this invention as cyanate polymerization catalysts. These various donor atoms will typically consist of or be a part of coordinating groups of the following types:

| | |
|---|---|
| =O | —N(H)=O |
| —OH | —N= |
| —OR | —S— |
| —NH$_2$ | —SH |
| —COOH | —SO$_3$H |
| —NH$_2$ | —AsR$_2$ |
| =NOH | —PR$_2$ |
| —N(R)H | —P(O)(OH) | where R is an alkyl, e.g., —CH$_3$, C$_2$H$_5$, etc., or aryl, e.g., phenyl. These coordinating groups are so situated in the ligand molecule that they permit the formation of a chelate ring, the metal ion being the closing member of the ring. Chelate rings of 5 to 6 members (with the metal ion being one of the ring members) are most common, and thus chelates with 5- or 6-membered rings are preferred catalysts in this invention, though chelates with 4 or 7 members, or more, are known and are also applicable as catalysts herein.

Representative of bidentate ligands having two oxygen donor atoms, useful in forming chelate catalysts useful in this invention, are the beta-diketones, such as acetylacetone, benzoylacetone, and hexafluoroacetylacetone; betahydroxyketones such as 2-acetylphenol; ketone esters such as ethylacetoacetate; dicarboxylic acids such as oxalic acid, malonic acid and phthalic acid; diglycols such as catechol; and hydroxy acids such as salicyclic acid. Bidentate ligands having an oxygen donor atom in combination with a nitrogen donor atom can also be used, as represented by amino alcohols such as ethanolamine, 8-hydroxy-quinoline, 2-hydroxy pyridine, and o-aminophenol; aminoketones such as 2-acetyl pyridine; aminoaldehydes such as 2-pyridine aldehyde; aminoacids such as 2-aminoacetic acid; salicylaldimines such as N-(n-butyl)salicylaldimine; beta-ketoimines such as phenyl-beta-ketoimine; and beta-hydroxy hydrazones such as the phenyl hydrazone of salicylaldehyde. Representative of bidentate ligands formed from two nitrogen donor atoms useful in forming metal chelates are diamines such as ethylene diamine and 1,2-diaminobenzene; aromatic heterocyclic bases such as 2,2'-bipyridyl and o-phenanthroline; alpha-dioximes such as dimethylglyoxime; biguanides such as biguanide; and quarylureas such as quarylurea. Metal chelates can also be formed from bidentate ligands having nitrogen donor atoms in combination with sulfur donor atoms, as represented by mercaptoamines such as 2-mercaptoethylamine, 2-aminothiophenol, and 8 - mercaptoquinoline; and by thiosemicarbazides such as methylthiosemicarbazide. Metal chelates can also be formed from bidentate ligands having sulfur donor atoms in combination with oxygen donor atoms, as represented by mercapto acids such as o-mercaptobenzoic acid and thioglycolic acid; and by thioether acids such as o-methylthiobenzoic acid and S-methylthioglycolic acid. Metal chelate catalysts can also be formed from bidentate ligands having two sulfur atoms as represented by dithioethers such as dimethyldithioethane; dimercaptans such as 1,2-benzenedithiol, and ethanedithiol; and thioethermercaptans such as o-methylthiobenzenethiol.

Tridentate ligands useful in forming metal chelate catalysts useful in this invention representatively include terpyridine, 8-(alpha-pyridylmethyleneamino)quinoline, pyridine-2-aldazine, salicylideneamino-o-hydroxybenzene, diethylenetriamine, phenyl bis(2-diethylphosphinophenyl) phosphine, salicylidene-2-aminomethyl pyridine, 1-(2-pyridy)-3-(2-benzthiazoyl)-2,3-diaza-1-propene.

Quadridentate ligands useful in forming metal chelate catalysts useful in this invention representatively include bis(acetylacetone)ethylenediimine, 1,2-bis(alpha-pyridylmethyleneamino)ethane, 2,2'-bis(salicylideneamino)-6,6'-dimethyldiphenyl, triethylenetetramine, 1,8-bis(alpha-pyridyl)-3,6-dithiooctane and tris-(o-diphenylarsinophenyl) phosphine. Quinquedentate ligands useful in forming metal chelates representatively include 1,9-bis(2-pyridyl)-2,5,8-triazanonane. Sexadentate ligands useful in forming metal chelates representatively include 1,8-bis(salicylideneamino)-3,6-dithiooctane and ethylene diaminetetraacetic acid.

Ligands which we have found to be particularly useful in forming non-ionic chelates, especially of the aforementioned transition metals, are 1-(2-pyridyl)-3-(2-benzothiazolyl)-2,3-diazo-1-propene, 1-phenyl-1,3-butanedione, 1,1,1,5,5,5-hexafluoro-2,4-pentanedione, 2,4-pentanedione, 2-hydroxybenzaldehyde, N(n-butyl)-salicylaldimine, and 8-hydroxyquinoline. Particular non-ionic chelates which we have found most suitable, especially in polymerizing aromatic dicyanates, such as 1,3-dicyanatobenzene, are zinc, cobalt, copper, manganese, and iron acetylacetonates, which can be generically expressed by the formula $M^n(AcAc)_m$, where M is the metal ion, $n$ is the oxidation state of the metal, AcAc is acetylacetonate, and $m$ is an integer equal to $n$. Other ligands we have found to be particularly useful in forming chelates of these metals are hexafluoroacetylacetone, salicylaldehyde, and benzoylacetone.

Ligands which we have found to be particularly useful in forming ionic chelates, especially of the aforementioned transition metals, are 1-(2-pyridyl)-3-(2-benzothiazolyl)-2,3-diaza-1-propene, oxalic acid, and ethylene diamine.

The chelate catalysts of this invention are in general more active in promoting polymerization of the polycyanate than the transition metal salts, such as $ZnCl_2$, $CuCl_2$, $CoBr_2$, and $FeCl_3$, and thus can be used in smaller amounts to achieve the desired rate of polymerization. The amount of chelate catalyst used in this invention can be broadly expressed, in functional terms, as that amount sufficient to catalyze or promote the polymerization of the polycyanate material. Generally, the amount of chelate will be from 0.01 to 10 mole percent, preferably from 0.05 to 1.0 mole percent, based on one mole of the polycyanate. The chelate is mixed with the polycyanate, which can be melted (in air or in an inert atmosphere) if desirable or necessary to promote intimate admixture. This intimate admixture can be facilitated by dissolving the chelate in a suitable inert, low boiling solvent, such as methylene chloride, chloroform or tetrahydrofuran, e.g. to provide a solution of 1 to 10 parts of catalyst per 100 parts by weight of solvent, adding the catalyst solution in the desired amount to the polycyanate (which can be in the molten state or also in solution), and then evaporating, stripping or otherwise removing the solvent from the mixture. The admixture can then be heated to cause polymerization (if a solvent is used, the heat necessary for its removal may provide the heat necessary to initiate polymerization). Polymerization can be initiated at temperatures in the range from 20° to 200° C., preferably in the range of 80° to 150° C. Polymerization is allowed to go to completion to form a cyanurate polymer essentially free of cyanate functionality.

The cyanurate ploymers of this invention can be used as cure-in-place resins or fabricated in the form of shaped articles, where thermal stability, chemical inertness, and solvent resistance is desirable or required, for example in the case of metal-to-metal structural adhesives used in airframe assembly. The mixture of polycyanate and chelate catalyst can be prepared and maintained at relatively low temperatures to minimize premature reaction, that is, to prevent polymerization or trimerization before one is ready to use or apply the resulting polymer. Such low temperatures generally will be in the range of —20° C. to room temperature, depending upon the particular polycyanate and chelate used. The mixture can be applied as an adhesive between two adherends or substrate assembly then warmed or heated to elevated temperature, or can be applied to one substrate and warmed or heated to elevated temperatures to effect initial tack or set before placing the other substrate thereon, and the bonded substrate assembly when warmed or heated to elevated temperatures to effect the polymerization and produce the desired bond. If desired, the polycyanate-chelate mixture can be admixed with a suitable solvent and the viscous solution brushed on the substrate for coating purposes or the solution can be used to impregnate paper or other fibrous or resinous materials to form composites. The mixture can be admixed with conventional fillers and used as a molding resin, or a tooling resin, or can be used in die casting.

The object and advantages of this invention are further illustrated by the following examples, but the particular materials and amounts thereof recited in these examples, as well as other conditions and details, should not be construed to unduly limit this invention.

EXAMPLES

Example 1

A number of non-ionic metal chelates were evaluated as catalysts in the polymerization of an aromatic dicyanate, namely, 2,2-bis(4-cyanatophenyl)propane. In each run, 2 g. of the dicyanate were mixed with 2 g. of methylene chloride solvent and 1 mole percent of the catalyst (based on the dicyanate), and the mixture placed in a sealed vial and maintained at room temperature (ca. 25° C.). The vials were observed periodically and the time at which gelation of the mixture was observed was recorded. In all of the runs, the gelled products eventually became hard, horny masses. For purposes of comparison, other runs were made in the same manner except that the catalysts used were metal chlorides. A control run was also made in which no catalyst was used. These runs and results obtained are summarized in Table II.

TABLE II

| Run | Catalyst [1] | Gelation time, hours |
|---|---|---|
| 1 | None (control) | [2] >15 |
| 2 | FeCl₃ | 137 |
| 3 | Fe(AcAc)₃ | <18 |
| 4 | Fe(Sal)₃ | 45 |
| 5 | Fe(BAc)₃ | 20 |
| 6 | CoCl₂ | [2] >15 |
| 7 | Co(AcAc)₂ | <18 |
| 8 | Co(F₆Ac)₂ | 66 |
| 9 | Co(Sal)₂ | 20 |
| 10 | Co(BAc)₂ | 28 |
| 11 | CuCl₂ | 116 |
| 12 | Cu(Sal)₂ | 31 |
| 13 | Cu(BAc)₂ | 100 |
| 14 | Cu(AcAc)₂ | 34 |
| 15 | Cu(F₆Ac)₂ | 54 |

[1] AcAc=acetylacetone, Sal=salicylaldehyde, BAc=benzoylacetone, F₆Ac=1,1,1,5,5,5-hexafluoroacetylacetone.
[2] Days.

The above data show that the metal chelates are more active as catalyst than the corresponding metal chlorides, and significantly increase the rate of polymerization as compared to the control, when polymerization is carried out at room temperature to form the cyanurate polymer.

EXAMPLE 2

A number of metal chelates were evaluated as catalysts, following the procedure of Example 1, using however 0.3 mole percent of the catalyst to determine their activity at lower levels (based on gelation time). Again, hard horny, solid products results, and a comparison was made with a metal chloride. The results (set forth in Table III) show that the metal chelates are more active at room temperature even at lower levels than the metal chloride, in promoting the polymerization of the dicyanate to cyanurate polymer.

TABLE III

| Run | Catalyst | Gelation time, hrs. |
|---|---|---|
| 1 | ZnCl₂ | >216 |
| 2 | [Zn(AcAc)₂] | 52 |
| 3 | [Zn(F₆Ac)₂] | 25 |
| 4 | [Fe(AcAc)₂] | 106 |
| 5 | [Co(AcAc)₂] | 54 |

EXAMPLE 3

In this example, a number of runs were made in which various metal chelates were used to promote the polymerization of bisphenol-A-dicyanate (compound 3 in Table I). The dicyanate used was first recrystallized from a solvent mixture of methylene chloride and hexane and then melted at 80–81° C. In each run, a 5 g. sample of dicyanate containing 0.01 millimole of catalyst was placed in an aluminum dish and heated at 200° F. until the melt became hard and impenetratable with a steel probe. All polymerization runs were carried out at 200° F. in the presence of ambient atmosphere. The time at which the melt became hard and impenetratable was noted and recorded as curing time. For comparison purposes, a control run was made and also other runs were made in which corresponding metal chlorides were used as catalysts, some of which runs were made by first storing the prepared samples for 24 hrs. or more at ambient conditions before heating to 200° F. Results are summarized in Table IV.

TABLE IV

| Run | Catalyst | Curing time |
|---|---|---|
| 1 | None (control) | Only slight increase in viscosity in 24 hrs. |
| 2 | FeCl₃ | 2 hrs. |
| 2A | FeCl₃ (stored first) | No cure at 12.5 hrs. |
| 3 | [Fe(AcAc)₃] | 2.5 hrs. |
| 4 | [Fe(Oxime)₃] | 6.5 hrs. |
| 5 | ZnCl₂ | <10 min. |
| 5A | ZnCl₂ (stored first) | No cure at 7 hrs. |
| 6 | Zn(CN)₂ | 24 hrs. |
| 7 | [Zn(F₆Ac)₂] | 1 hr. |
| 8 | [Zn(AcAc)₂] | 1 hr. |
| 9 | CoCl₂ | 19.5 hrs. |
| 10 | [Co(AcAc)₂] | 16.5 hrs. |
| 11 | [Co(Oxime)₂] | 15.7 hrs. |
| 12 | [Co(BAc)₂] | 13 hrs. |
| 13 | CuCl₂ | 3.3 hrs. |
| 13A | CuCl₂ (stored first) | No cure at 7.5 hrs. |
| 14 | [Cu(F₆Ac)₂] | 3 hrs. |
| 15 | [Cu(Oxime)₂] | 6 hrs. |
| 16 | [Cu(BAc)₂] | 3.5 hrs. |

The above data show that polymerization does not proceed at any significant rate in the absence of catalytic material. Further, although the non-chelates did promote polymerization, the rate was either far too rapid to permit ease of control or was far too slow to be significant, whereas the metal chelate catalysts of this invention promoted polymerization in a controlled manner. The data further show that the metal chloride catalysts lost much of their activity when exposed for any length of time to the ambient atmosphere, probably due to their hydrolysis.

Example 4

In this example, 2 g. of 3-perfluoroethyl-2,2,3,4,4,5,5-heptafluorohexane dicyanate were mixed with 2 milligrams of [Zn(F₆Ac)₂]. A viscosity of >200,000 cps. was obtained after heating the mixture at 100° C. for about 25 min. A similar run made without catalysts required about 2 hrs. at 150–200° C. to reach the same viscosity level. These runs illustrate for this particular system the significant increase in rate of polymerization obtained even at lower temperatures when a metal chelate is used to polymerize the dicyanate.

Example 5

In this example, 1,3-dicyanatobenzene (resorcinol dicyanate) was melted and mixed with 0.05 mole percent of [Zn(AcAc)₂] (in a solution of tetrahydrofuran), the solvent evaporated, and the mixture filtered through cheese cloth and cast in the form of a bar, which was heated at 80° C. in a vacuum oven to strip off residual solvent and effect polymerization at this temperature. A hard, horny, cured polycyanurate product was obtained in 16 hrs. In a similar run, using 0.05 mole percent of resorcinol instead of the zinc chelate, a cured product was obtained only after 48 hrs. In a control run, using no catalytic material, the product obtained was still fluid after 4 days. This example again demonstrates the improved rate of polymerization obtained with a metal chelate.

Example 6

The utility of the chelate-catalyzed dicyanate system of this invention as an adhesive is shown by a series of runs in this example, using two different metal chelates and comparing the results obtained with a control dicyanate adhesive system in which no catalyst was used. In each run, aluminum alloy panels (97% aluminum) were overlapped ½″ with the adhesive system on the glue line. The overlapped panels were cured in a press at 250° F. for 2 hrs. under a pressure of 25 psi. Some of the runs in each series were post cured at about 450–500° F. for 30 min. After being cured, the bonded panels were pulled at various temperatures on a standard Instron machine to determine the strength of the overlap shear bonds. Results are summarized in Table V.

TABLE V

| Catalyst | Pull temp.,° F. | | Shear strength, p.s.i. |
|---|---|---|---|
| None (control): | | | |
| Initial cure | R.M. temp | | ~10 |
| | 250 | | ~5 |
| | 500 | | ~0 |
| Post cure | R.m. temp | | 500 |
| | 500 | | 1,500 |
| [Zn(AcAc)₂]: | | | |
| Initial cure | R.m. temp | | 1,500 |
| | 250 | | 2,500 |
| | 500 | | 1,525 |
| Initial cure | R.m temp | | 1,750 |
| | 500 | | 2,300 |
| [Cu(AcAc)₂]: | | | |
| Initial cure | R.m temp | | 1,000 |
| | 250 | | 1,200 |
| | 500 | | 1,100 |
| Post cure | R.m. temp | | 1,950 |
| | 500 | | 2,700 |

The above data demonstrate the significantly greater shear strength obtained from bonds made with the chelate catalyzed adhesive system of this invention.

Example 7

Test bars of 2,2-bis(4-cyanatophenyl) propane, containing 0.05 mole percent of a metal chelate, were cast in an iron mold. The cast bars were initially heated at 300° F. for 2 hrs. to effect polymerization, followed by heating for 1 hr. at 350° F. and then ½ hr. at 500° F. to effect complete polymerization or curing. The cured bars were then tested for flexual strength and modulus at 400° F. both before and after aging them at 400° F. for 1,000 hrs. Results are summarized in Table VI, together with the results obtained for a test bar made in a similar fashion without catalyst.

TABLE VI

| | | Modulus, p.s.i. | | Flexural strength, p.s.i. | |
|---|---|---|---|---|---|
| Run | Catalyst | Initial | Aged | Initial | Aged |
| 1 | None (control) | 220,000 | 110,000 | 7,200 | 2,600 |
| 2 | [Zn(AcAc)₂] | 280,000 | 280,000 | 9,700 | 10,000 |
| 3 | [Cu(AcAc)₂] | 300,000 | 130,000 | 10,000 | 2,600 |

The above data show significantly greater flexural strength and modulus for the bars before aging as well as after aging, the catalyst of Run 2 resulting in a product which retained its flexural strength and modulus after aging.

Example 8

In this example, a number of runs were made in which a mixture of 2,2-bis(4-cyanatophenyl) propane and 0.1 mole percent of an ionic metal chelate was heated in a vial in an oil bath at 100° C., and the time required for each sample to cure into a hard solid was recorded. Results are set forth in Table VII, together with the results of a control run in which no catalyst was used.

TABLE VII

| Run | Catalyst¹ | Cure time, hrs. |
|---|---|---|
| 1 | None (control) | (²) |
| 2 | [Zn(PDDP)₃](NO₃)₂ | 1–1.5 |
| 3 | K₃[Al(Ox)₃].3H₂O | 10–10.5 |
| 4 | K₃[Fe(Ox)₃].3H₂O | 10–10.5 |
| 5 | K₃[Co(Ox)₃].3H₂O | 11–11.5 |
| 6 | K₂[Cu(Ox)₂].nH₂O | 11–11.5 |
| 7 | K₃[Cr(Ox)₃].3H₂O | 12–12.5 |
| 8 | [Co(EDA)]Cl₃ | 11–11.5 |

¹ PDDP=1-(2-pyridyl)-3-(2-benzothiazolyl)-2,3-diaza-1-propene, Ox= oxalate anion, EDA=ethylene diamine.
² Not cured at 13 hrs.

The data of Table VII show that ionic metal chelates are also useful in promoting the polymerization of dicyanates, though the rate of polymerization is not as high as that obtained with non-ionic metal chelates.

Various modifications and alterations of this invention will become apparent to those skilled in the art without departing from the scope and spirit of this invention, and it should be understood that this invention is not to be unduly limited to the illustrative embodiment set forth herein.

I claim:

1. A process comprising heating polycyanate of the formula NCO—R—OCN, where R is an arylene nucleus or a plurality of arylene nuclei which can be linked by —O—, —C(O)—, —S—, —SO₂— or divalent hydrocarbon moieties, or R is a methylene-terminated, divalent fluoroaliphatic chain, in the presence of a catalytic amount of non-ionic metal chelate to form polycyanurate.

2. The process of claim 1, wherein said metal chelate is an acetylacetonate of zinc, cobalt, copper, manganese or iron.

3. The process of claim 1, wherein said polycyanate is 1,3-dicyanatobenzene, 2,2-di(p - cyanatophenyl)propane, or 4,4'-dicyanatodiphenyl ether.

4. The process of claim 1, wherein said heating is at a temperature of 20 to 200° C.

5. The process of claim 1, wherein said catalyst is present in the amount of 0.01 to 10 mole percent per mole of polycyanate.

6. The process of claim 2, wherein said metal chelate is an acetylacetonate of zinc, cobalt, copper, manganese or iron, and wherein said polycyanate is heated at 80 to 150° C. with an amount of said metal chelate sufficient to polymerize said polycyanate to form a polycyanurate.

7. A process comprising heating at 80 to 150° C. dicyanate selected from the group consisting of 1,3-dicyanatobenzene, 2,2-di(p-cyanatophenyl)propane, 4,4'-dicyanatodiphenyl ether, and 1,4-dicyanatomethyl-2-perfluoroethylperfluorobutane in the presence of 0.05 to 1 mole percent, based on a mole of said dicyanate, of an acetylacetonate of zinc, cobalt, copper, manganese or iron, to produce polycyanurate.

8. The process of claim 7, wherein said dicyanate is 1,3-dicyanatobenzene, 2,2 - di(p-cyanatophenyl)propane, or 4,4'-dicyanatodiphenyl ether, and said metal chelate is an acetylacetonate of zinc or manganese.

References Cited

FOREIGN PATENTS 1,190,184   4/1965   Germany.

OTHER REFERENCES

Kirk-Othmer, Encyclopedia of Chemical Technology, 2nd ed., vol. 6 (page 20 supplied), 1965.

MELVIN GOLDSTEIN, Primary Examiner

U.S. Cl. X.R.

161—270

UNITED STATES PATENT OFFICE
CERTIFICATE OF CORRECTION

Patent No. 3,694,410          Dated September 26, 1972

Inventor(s) RICHARD W. OEHMKE

It is certified that error appears in the above-identified patent and that said Letters Patent are hereby corrected as shown below:

Column 3, Formula 16 should read as follows:

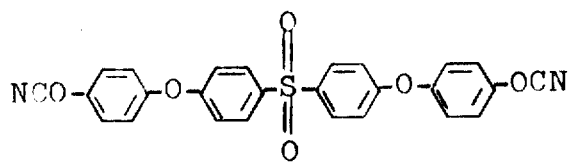

Column 4, line 61, the second formula should read:

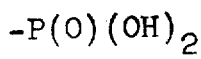

Column 5, line 43, should read as follows:

idyl)-3-(2-benzthiazoyl)-2,3-diaza-1-propene.

Column 6, lines 45-49 should read as follows:

.....polycyanate and chelate used. The mixture can be applied as an adhesive between two adherends or substrates, for example, by brushing on one substrate and placing the other substrate thereon, and the bonded substrate assembly then warmed or heated to elevated temperatures .......

UNITED STATES PATENT OFFICE
CERTIFICATE OF CORRECTION

Patent No. 3,694,410 Dated September 26, 1972

Inventor(s) RICHARD W. OEHMKE

It is certified that error appears in the above-identified patent and that said Letters Patent are hereby corrected as shown below:

Column 7, Table II, the catalyst for runs 3-5, 7-10 and 12-15, respectively should be set off in brackets.

Column 9, Table VII, the catalyst for Run 2 should read as follows:

$$[Zn(PDDP)_2](NO_3)_2$$

Signed and sealed this 13th day of February 1973.

(SEAL)
Attest:

EDWARD M. FLETCHER, JR.
Attesting Officer

ROBERT GOTTSCHALK
Commissioner of Patents